(12) United States Patent
Yamamoto et al.

(10) Patent No.: US 7,739,550 B2
(45) Date of Patent: Jun. 15, 2010

(54) TEST CASE SELECTION APPARATUS AND METHOD, AND RECORDING MEDIUM

(75) Inventors: Hiroshi Yamamoto, Kyoto (JP); Kiyotaka Kasubuchi, Kyoto (JP); Taku Mizuno, Kyoto (JP)

(73) Assignee: Dainippon Screen Mfg. Co. Ltd., Kyoto (JP)

( * ) Notice: Subject to any disclaimer, the term of this patent is extended or adjusted under 35 U.S.C. 154(b) by 413 days.

(21) Appl. No.: 11/808,951

(22) Filed: Jun. 14, 2007

(65) Prior Publication Data

US 2008/0010542 A1 Jan. 10, 2008

(30) Foreign Application Priority Data

Jun. 15, 2006 (JP) .................... P2006-165605

(51) Int. Cl.
*G06F 11/00* (2006.01)
(52) U.S. Cl. .................................... 714/38; 714/46
(58) Field of Classification Search .............. 714/25, 714/38, 46
See application file for complete search history.

(56) References Cited

U.S. PATENT DOCUMENTS 5,671,351 A * 9/1997 Wild et al. ............ 714/38
5,684,726 A * 11/1997 Osborn et al. ........... 702/123
5,864,658 A * 1/1999 Theobald ................ 714/25
6,810,372 B1 * 10/2004 Unnikrishnan et al. ...... 703/13

FOREIGN PATENT DOCUMENTS

JP 2003-099283 4/2003

* cited by examiner

*Primary Examiner*—Joshua A Lohn
(74) *Attorney, Agent, or Firm*—McDermott Will & Emery LLP

(57) ABSTRACT

In a test case selection apparatus according to the present invention, a parameter setting unit 22 displays a test case selection dialogue 400, etc., on a display screen of a display section 40, and test cases that are tentatively determined to be tested in the current round of testing is selected based on various parameters received from the operator. A simulation executing unit 23 calculates a time period predicted to be required for testing test cases, and displays the prediction result in the form of a graph indicating a temporal change in the number of tests. With this configuration, the user can predict an achieved status of testing based on the prediction result, and repeat suitable changes to the various parameters, thereby suitably selecting test cases to obtain a preferably achieved status of testing.

11 Claims, 6 Drawing Sheets

Fig. 5

```
┌─────────────────────────────────────────────────────────┐
│ THINNING PARAMETER SETTINGS              ─ □ ×          │
│ TEST PROJECT NAME : TEST                                │
│ THINNING FROM ALL TEST CASES                            │
│ ┌─────────────────────────────────────────────────┐    │
│ │ RANK       [ C  ▼]─501                          │    │
│ │            ┌──────────────────────────────┐▲    │    │
│ │            │ FUNCTIONAL TEST      ☑       │     │    │
│ │ TEST       │ SCENARIO TEST        ☑       │     │─502│
│ │ CATEGORIES │ REGRESSION TEST      ☐       │     │    │
│ │            │ USABILITY TEST       ☑       │▼    │    │
│ │            └──────────────────────────────┘     │    │
│ │ REGISTRATION                                    │    │
│ │ DATES     [            ] ~ [            ]─503   │    │
│ └─────────────────────────────────────────────────┘    │
│ THINNING BASED ON OCCURRED ERROR                        │
│ ┌─────────────────────────────────────────────────┐    │
│ │ CORRECTED ERROR  [ MINOR           ▼]─504       │    │
│ └─────────────────────────────────────────────────┘    │
│ THINNING OF TEST SPECIFICATIONS                         │
│ ┌─────────────────────────────────────────────────┐▲   │
│ │STATUS TEST          NORMALLY       THINNING     │    │
│ │       SPECIFICATION OPERATED IN                 │    │
│ │       NAMES         PREVIOUS ROUND              │    │
│ │                                                 │    │
│ │       TS00001       100 %          ☑            │    │
│ │  △    TS00002        50 %          ☐            │─505│
│ │       TS00003        10 %          ☐            │    │
│ │       TS00004        70 %          ☐            │▼   │
│ └─────────────────────────────────────────────────┘    │
│    O: COMPLETED  △: EXECUTING  NO SYMBOL: UNEXECUTED   │
│                       506 ─[   OK   ]  [ CANCEL ]      │
│                                                  507   │
└─────────────────────────────────────────────────────────┘
```
─500

Fig. 6

```
┌─────────────────────────────────────────────────────┐ ─600
│ ESSENTIAL SELECTION PARAMETER SETTINGS      _ □ ×   │
│ TEST PROJECT NAME : TEST                            │
│ SELECTION FROM ALL TEST CASES                       │
│ ┌─────────────────────────────────────────────────┐ │
│ │ RANK         [    ▼]─601                        │ │
│ │              ┌──────────────────────────────┐▲  │ │
│ │              │ FUNCTIONAL TEST    □         ││  │ │
│ │ TEST         │ SCENARIO TEST      □         ││──602
│ │ CATEGORIES   │ REGRESSION TEST    ☑         ││  │ │
│ │              │ USABILITY TEST     □         │▼  │ │
│ │              └──────────────────────────────┘   │ │
│ │ KEYWORD      ┌─────────────────────────────┐    │ │
│ │ SEARCH       │                             │──603
│ │              └─────────────────────────────┘    │ │
│ └─────────────────────────────────────────────────┘ │
│ SELECTION BASED ON OCCURRED ERROR                   │
│ ┌─────────────────────────────────────────────────┐ │
│ │ CORRECTED ERROR   [              ▼]─604         │ │
│ └─────────────────────────────────────────────────┘ │
│ SELECTION OF TEST SPECIFICATIONS                    │
│ ┌─────────────────────────────────────────────────┐ │
│ │ STATUS TEST          NORMALLY    SELECTION   ▲  │ │
│ │        SPECIFICATION OPERATED IN                │ │
│ │        NAMES         PREVIOUS ROUND             │ │
│ │        TS00001       100 %         ☑            │ │
│ │   △    TS00002        50 %         □         ──605
│ │        TS00003        10 %         □            │ │
│ │        TS00004        70 %         □         ▼  │ │
│ └─────────────────────────────────────────────────┘ │
│  ○: COMPLETED   △: EXECUTING   NO SYMBOL: UNEXECUTED│
│                         606─[  OK  ]  [ CANCEL ]    │
│                                              607    │
└─────────────────────────────────────────────────────┘
```

TEST CASE SELECTION APPARATUS AND METHOD, AND RECORDING MEDIUM

BACKGROUND OF THE INVENTION

1. Field of the Invention

The present invention relates to techniques for testing a software system, and particularly to a technique for narrowing down test cases when repeatedly executing tests.

2. Description of the Background Art

Conventionally, there have been various known software system development methodologies, including the "waterfall development methodology", the "prototype development methodology" and the "spiral development methodology". Software system development phases of these various development methodologies include "requirements definition", "designing", "programming", "testing" and so on. Among these phases, testing of a software system is generally carried out in accordance with a test specification. The test specification describes for each test case a test method, conditions for determining a pass or fail (a success or failure), and so on.

In software system development, the above-mentioned phases are sometimes repeated. In such a case, testing is repeatedly performed on test cases originally generated during development or test cases generated in accordance with, for example, specification changes. However, in the software system development, it is sometimes difficult to test all test cases for reasons of limitations in development time, human resources and so on. In such a case, it is necessary to select test cases that are to be tested in the current phase from all test cases. Where the number of test cases is small, test case selection can be carried out relatively easily even if it is carried out manually. However, as the number of test cases increases, the manual test case selection becomes difficult.

Therefore, conventionally, test case selection in accordance with, for example, importance levels of test cases are carried out by computer software processing. Specifically, the test cases are classified into ranks H, M and L (High, Middle and Low, respectively) in accordance with their importance levels, and the test case selection is performed, for example, such that only rank-H test cases are tested or only rank-H and rank-M test cases are tested.

Japanese Laid-Open Patent Publication No. 2003-99283 discloses a design support method for designing optimal test cases, in which system characteristics are represented by characteristic values based on a plurality of evaluation perspectives, regarding specification items extracted from a system specification, and a testing strategy suitable for the system targeted for the testing is generated and selected, thereby deriving testing priority levels indicating specification items that are to be preferentially tested.

However, according to the above-described conventional art, the test cases are automatically selected in accordance with their priority or importance levels, which are set based on characteristics, etc., of the software system, and therefore it is possible to save a test case designer or administrator the trouble, but it is not possible to suitably change the set priority or importance levels, and thereby to change the number of test cases that are to be selected. In particular, it is necessary to repeatedly select suitable test cases (specifically, a suitable number of test cases) through a trial and error process, considering various factors, such as the set priority or importance levels, and thereby to predict (simulate) an achieved status of testing, in order to enhance the quality of testing, i.e., the quality of the software system that is to be tested, considering a limited remaining development time. However, the above-described conventional art does not particularly take such changes into consideration.

In addition, an apparatus user, such as the designer or administrator, might determine some test cases to be tested without fail, regardless of the set priority or importance levels, or conversely some test cases might be determined not to be tested. However, according to the above-described conventional art, it is not possible to select the test cases based on such determinations.

SUMMARY OF THE INVENTION

Therefore, an objective of the present invention is to provide a test case selection apparatus capable of predicting an achieved status of testing in the case where test cases that are to be executed in the current round of testing are suitably selected from among previously generated test cases during software system development. In addition, another objective of the present invention is to provide a test case selection apparatus that allows the user to suitably select, based on his or her determination, preferable test cases that are to be executed in the current round of testing from among previously generated test cases.

The present invention has the following features to attain the objectives mentioned above.

One aspect of the present invention is directed to a test case selection apparatus for selecting an execution target test case group, which consists of a plurality of test cases that are to be executed in a current round of testing, from among a generated test case group, which consists of a plurality of test cases that are previously generated and that are to be repeatedly tested, the apparatus including:

a parameter setting unit for accepting an operational input to set a predetermined parameter intended to select or not to select a plurality of test cases from among the generated test case group as a tentative execution target test case group;

a simulation executing unit for selecting the tentative execution target test case group from among the generated test case group based on the parameter set by the parameter setting unit, calculating a time period that is predicted to be required for testing the selected tentative execution target test case group based on a time period required for testing the generated test case group, and displaying a prediction result containing information concerning the calculated time period; and a test case determining unit for accepting an operational input to establish the tentative execution target test case group as the execution target test case group in accordance with the prediction result displayed by the simulation executing unit, and establishing the tentative execution target test case group as the execution target test case group upon acceptance of the operational input, wherein when the operational input to establish the tentative execution target test case group as the execution target test case group is not accepted, the test case determining unit is capable of accepting a further operational input to establish the tentative execution target test case group as the execution target test case group in accordance with a different prediction result displayed by the simulation executing unit based on a different parameter accepted by the parameter setting unit.

According to this configuration, for example, the parameter setting unit accepts, from the operator, an operational input to set a predetermined parameter that is intended to select or not to select a tentative execution target test case group, and the simulation executing unit selects the tentative execution target test case group based on the parameter, calculates a time period that is predicted to be required for testing the tentative execution target test case group based on a time period required for testing a generated test case group, and displays a prediction result containing information concerning the calculated time period. Accordingly, the operator can predict an achieved status of testing based on the prediction result. In addition, the operator repeats suitable changes to the various parameters, thereby suitably selecting test cases to obtain a preferably achieved status of testing. Therefore, for example, it is possible to select preferred test cases that are to be tested by the scheduled completion day for the testing (typically, without running out of time to perform important testing), thereby making it possible to more efficiently track down any malfunction present in the software system targeted for the testing. As a result, it becomes possible to provide a high-quality software system in a lesser number of man-hours.

In the test case selection apparatus thus configured, the parameter setting unit may include:

an essential selection parameter setting unit for accepting an operational input to set a predetermined parameter for defining an essential selection target test case group that is always selected as the tentative execution target test case group; and a thinning parameter setting unit for accepting an operational input to set a predetermined parameter for defining a thinning target test case group that is never selected as the tentative execution target test case group unless being included in the essential selection target test case group.

According to this configuration, the parameter setting unit includes the essential selection parameter setting unit for accepting an operational input to set a predetermined parameter for defining an essential selection target test case group that is always selected, and the thinning parameter setting unit for accepting an operational input to set a predetermined parameter for defining a thinning target test case group that is never selected unless being included in the essential selection target test case group. Therefore, for example, the test cases that are determined by the apparatus operator, such as the designer or administrator, to have to be tested regardless of the priority or importance level set for each test case, are selected by the essential selection parameter setting unit, and conversely, the test cases that are determined not to have to be tested are selected by the thinning parameter setting unit. Thus, it is possible to suitably select preferred test cases that are to be tested in the current round of testing, based on the user's determination.

Furthermore, in the test case selection apparatus thus configured, the parameter setting unit may accept an operational input to set a total number of test cases that are to be included in the tentative execution target test case group, and the simulation executing unit may further select the tentative execution target test case group from among the generated test case group, excluding the essential selection target test case group and the thinning target test case group, based on a predetermined criterion for determining a degree of necessity of testing, the tentative execution target test case group being selected so as to include test cases equal in number to the total number.

According to this configuration, the tentative execution target test case group may further be automatically selected from among the generated test case group, excluding the essential selection target test case group and the thinning target test case group, based on a predetermined criterion for determining a degree of necessity of testing, such that the tentative execution target test case group includes test cases equal in number to the total number accepted by the parameter setting unit. Thus, it is possible to save the operator the trouble of determining whether or not to select for each test case, while considering the operator's determination as to whether or not to select test cases.

Furthermore, in the test case selection apparatus thus configured, the simulation executing unit may display, as the prediction result, a graph indicating a temporal change in number of executions predicted when the tentative execution target test case group is tested.

According to this configuration, the simulation executing unit displays, as the prediction result, a graph indicating a temporal change in the number of predicted executions. Since the prediction result is displayed in the form of an easily readable graph, for example, the operator can readily make an intuitive (quick) determination.

Furthermore, in the test case selection apparatus thus configured, when the generated test case group is tested, the simulation executing unit may display at least either a graph indicating a temporal change in a predetermined number of scheduled executions or a graph indicating a temporal change in number of test cases that have been tested within the generated test case group.

According to this configuration, the simulation executing unit displays at least either a graph indicating a temporal change in the number of scheduled executions or a graph indicating a temporal change in the number of test cases that have been tested, and therefore, for example, it is possible to allow the operator to readily determine whether it is necessary to select further test cases.

Furthermore, the test case selection apparatus thus configured may further include a monitoring unit for monitoring tests executed by the apparatus or a device external to the apparatus, wherein the monitoring unit excludes test cases that have been tested in the current round of testing from among the generated test case group.

According to this configuration, the monitoring unit monitors tests executed by the apparatus or a device external to the apparatus, and test cases for which the current round of testing has been executed are excluded from the generated test case group. Thus, it is possible to change not only the current round of testing in early stages of planning, but also the test plan for remaining test cases during execution of the current round of testing.

Another aspect of the present invention is directed to a recording medium having recorded thereon a test case selection program for implementing, a test case selection apparatus for selecting an execution target test case group, which consists of a plurality of test cases that are to be executed in a current round of testing, from among a generated test case group, which consists of a plurality of test cases that are previously generated and that are to be repeatedly tested, the program, when executed by a general-purpose computer, causing the computer to perform:

a parameter setting step of accepting an operational input to set a predetermined parameter intended to select or not to select a plurality of test cases from among the generated test case group as a tentative execution target test case group;

a simulation executing step of selecting the tentative execution target test case group from among the generated test case group based on the parameter set in the parameter setting step, calculating a time period that is predicted to be required for testing the selected tentative execution target test case group based on a time period required for testing the generated test case group, and displaying a prediction result containing information concerning the calculated time period; and a test case determining step of accepting an operational input to establish the tentative execution target test case group as the execution target test case group in accordance with the prediction result displayed in the simulation executing step, and establishing the tentative execution target test case group as the execution target test case group upon acceptance of the operational input, wherein when the operational input to establish the tentative execution target test case group as the execution target test case group is not accepted, the test case determining step is capable of accepting a further operational input to establish the tentative execution target test case group as the execution target test case group in accordance with a different prediction result displayed in the simulation executing step based on a different parameter accepted in the parameter setting step.

According to this configuration, the test case selection program can allow the general-purpose computer to achieve effects corresponding to the above-mentioned effects achieved by the test case selection apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating an exemplary display of a thinning parameter setting dialogue in the embodiment; and FIG. 6 is a diagram illustrating an exemplary display of an essential selection parameter setting dialogue in the embodiment.

DESCRIPTION OF THE PREFERRED EMBODIMENT

Hereinafter, an embodiment of the present invention will be described with reference to the accompanying drawings.

<1. Overall Apparatus Configuration>

Figure 1:
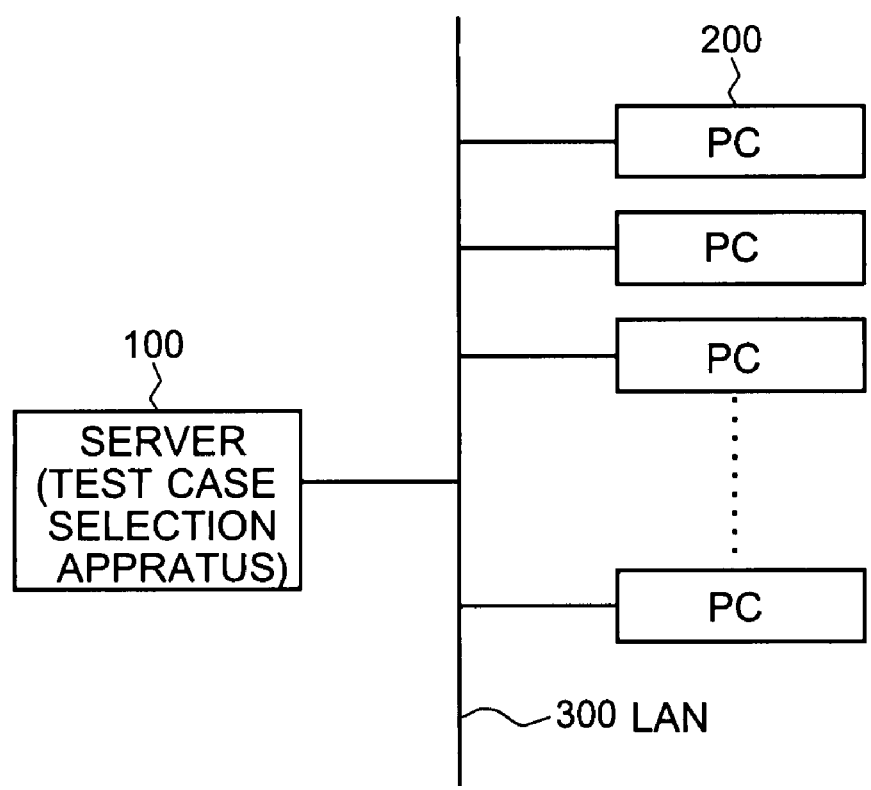
FIG. 1 is a diagram illustrating a hardware configuration of an overall software system development environment, which includes a test case selection apparatus according to an embodiment of the present invention.

FIG. 1 is a diagram illustrating a hardware configuration of an overall software system development environment, which includes a test case selection apparatus according to an embodiment of the present invention. The system includes a server 100 and a plurality of personal computers (hereinafter, abbreviated as "PCs") 200, and the server 100 and the PCs 200 are connected with each other via a LAN (Local Area Network) 300.

For example, the server 100 executes processing in accordance with requests from the PCs 200, and stores, for example, files and databases that can be commonly referenced by the PCs 200. In addition, the server 100 selects suitable test cases for a current round of testing that is to be executed in software system development, and predicts an achieved status of the testing. Accordingly, the server 100 will be referred to below as the "test case selection apparatus 100". For example, the PCs 200 perform tasks such as programming for the software system development, execute testing, and input test results.

Figure 2:
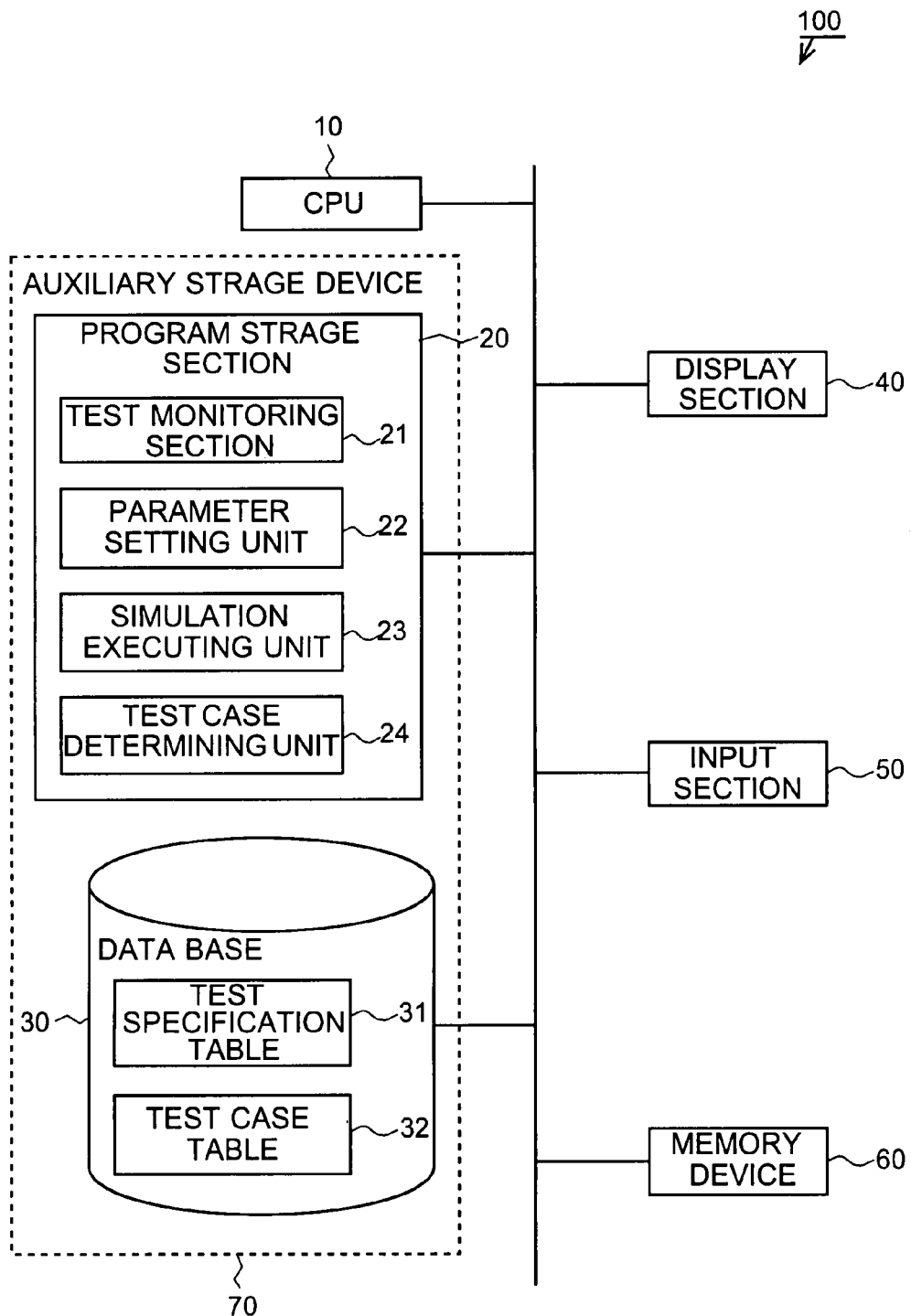
FIG. 2 is a block diagram illustrating the configuration of the test case selection apparatus in the embodiment.

FIG. 2 is a block diagram illustrating the configuration of the test case selection apparatus 100. The test case selection apparatus 100 is a general-purpose computer, which includes a CPU 10, a display section 40, which is composed of, for example, a liquid crystal panel or a CRT, an input section 50, which is composed of, for example, a keyboard and a mouse, a memory device 60, an auxiliary storage device 70, which is composed of, for example, a hard disk drive, and an unillustrated section for communicating with the LAN 300.

The auxiliary storage device 70 includes a program storage section 20 and a database 30. The CPU 10 performs various operations in accordance with given instructions. The program storage section 20 has stored therein programs (execution modules) for implementing their respective functions as a test monitoring unit 21, a parameter setting unit 22, a simulation executing unit 23, and a test case determining unit 24. The CPU 10 executes these components on the memory device 60 to perform a test case selection process, which will be described later.

Here, for example, the programs for implementing the functions of the aforementioned components are partially or entirely provided by a computer-readable recording medium such as a CD-ROM having the programs stored therein. The CD-ROM is loaded into an unillustrated CD-ROM drive device, so that the programs are read from the CD-ROM, and installed into the auxiliary storage device 70 of the test case selection apparatus 100. Note that the programs may be provided from outside the apparatus via a predetermined communication line.

The database 30 has stored therein a test specification table 31, and a test case table 32. For example, the test specification table 31 contains, for each test specification, a test specification number, the name of the test specification, a general description, the name of the last person in charge, test case numbers contained in the test specification, and the number of days (predicted value) required for testing the test cases contained in the test specification. In this manner, the number of days required for testing the test cases is stored for each test specification.

In addition, the test case table 32 contains, for example, test case numbers, test categories, testing methods, test data, test data general descriptions, importance ranks, determination conditions, test results, reporters, and report dates. Here, the stored test results include, in addition to descriptions such as "success" and "failure", which indicate whether the test is successful or not, descriptions such as "to be evaluated", which indicates that the test is currently underway, "unexecuted", which indicates that the test is scheduled but not yet executed, and "untested", which indicates that the test case is thinned out (deselected) as described later. Alternatively, the stored results may be numerical values or codes corresponding to the aforementioned descriptions.

In this manner, a plurality of test specifications are generated for one test project, and each test specification contains a plurality of test cases. In addition, each time testing is carried out, test results are written to the test case table 32 as test case attributes. At this time, an integrated value of time actually spent for testing may be written to the test specification table 31, and used as the number of testing days (actual value).

The display section 40 displays, for example, an operating screen with which the operator selects test cases. The input section 50 accepts the operator's input via a mouse or a keyboard. The operation of the test case selection apparatus 100 will be described below with reference to FIG. 3, and with respect to the case where test cases to be tested are selected by thinning out (deselecting) a predetermined number of test cases from among all test cases that have not been tested in the current round of testing.

<2. Operation of the Apparatus>

Figure 3:
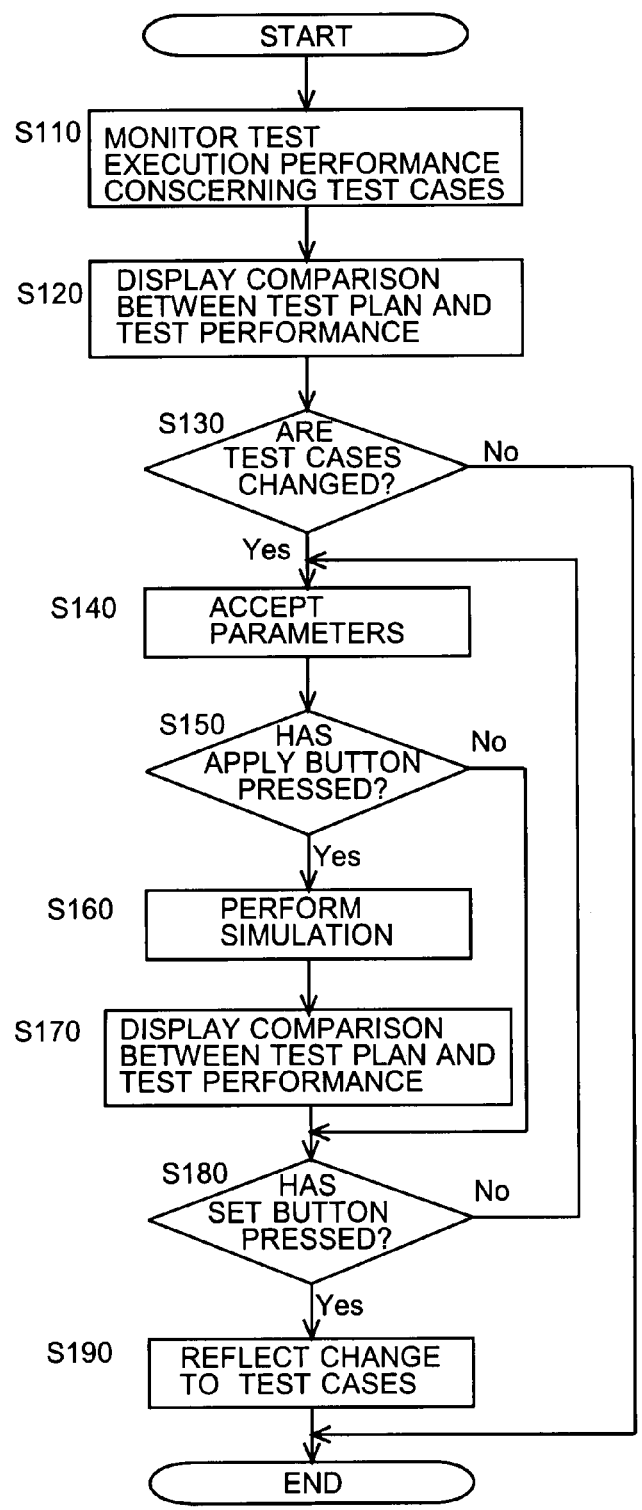
FIG. 3 is a flowchart illustrating an exemplary processing procedure of a test case selection process in the embodiment.

FIG. 3 is a flowchart illustrating an exemplary processing procedure of the test case selection process in the present embodiment. As shown in FIG. 3, first, the test monitoring unit 21 included in the test case selection apparatus 100 is activated to select test cases, and monitors execution performance (test performance) of each PC 200 in terms of testing of test cases (step S110). In fact, the test case selection apparatus 100 is continuously operated, and the test monitoring unit 21 continuously receives information concerning test performance for each PC 200, including whether tests have been performed by the PC 200 and the test results (in particular, unexecuted or not), but for ease of description, here, it is assumed that test performance information about all tests is received in this process. The test monitoring unit 21 writes the received test performance information to the test case table 32 saved in the database 30, in association with, for example, the names of the tests.

Here, in the present embodiment, a predetermined number of test cases are thinned out (deselected) from among all test cases that have not been executed in the current round of testing, thereby selecting the test cases that are to be tested, and therefore test cases that have been executed in the current round of testing are excluded from selection by the test monitoring unit 21. Therefore, the test case selection apparatus 100 can be used not only in early stages of planning the current test project, but also during the current test project in order to change the plan.

Note that the aforementioned test performance information may be acquired by monitoring test execution statuses in each PC 200 in real time, but it is assumed here that it is obtained by test executors who operate the PCs 200 to execute tests and input the test results to the PCs 200.

Next, the parameter setting section 22 included in the test case selection apparatus 100 displays on the display screen of the display section 40 an operating screen containing a graph in which the original test schedule is compared with test performance (or predicted test performance) (step S120). The operating screen will be described by way of example with reference to FIG. 4.

Figure 4:
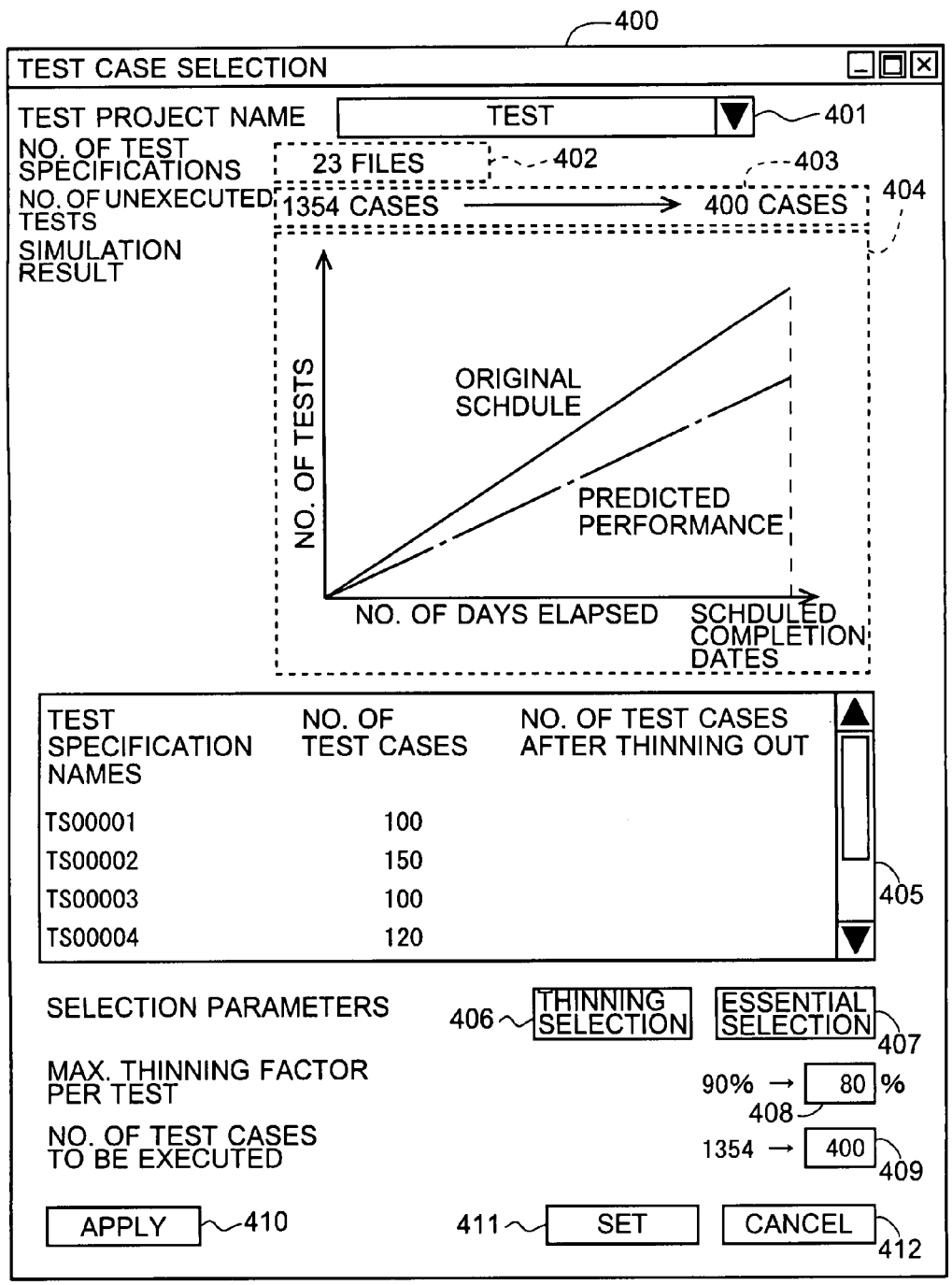
FIG. 4 is a diagram illustrating an exemplary display of a test case selection dialogue in the embodiment.

FIG. 4 is a diagram illustrating an exemplary display of a test case selection dialogue 400. As shown in FIG. 4, the test case selection dialogue 400 includes: a list box 401 provided in the form of a pull-down menu for selecting a test project name; a display area (hereinafter, referred to as the "test specification number display area") 402 in which to display the number of test specifications included in the test project selected from the list box 401; a display area (hereinafter, referred to as the "test case number display area") 403 in which to display the number of test cases after execution of a simulation process to be described later; a display area (hereinafter, referred to as the "simulation result display area") 404 in which to display a graph in which an originally scheduled test plan is compared with predicted test performance after selection of test cases; a display area (hereinafter, referred to as the "selection result display area") 405 in which to display, for each test specification, the numbers of test cases before and after execution of the simulation process; a thinning selection button 406 with which to display a thinning parameter setting dialogue 500 to be described later; an essential selection button 407 with which to display an essential selection parameter setting dialogue 600 to be described later; a text box (hereinafter, referred to as the "thinning factor setting text box") 408 with which to set a maximum test case thinning factor for each test specification; a text box (hereinafter, referred to as the "test case execution number setting text box") 409 with which to set the number of test cases (scheduled) to be executed in the entire test project; an Apply button 410 with which to execute the selection process based on, for example, parameters set by the operator; an Set button 411 with which to ultimately reflect, in the test case table 32, selection results displayed in the simulation result display area 404 and the selection result display area 405; and a Cancel button 412 with which to cancel and terminate the test case selection process.

Here, the simulation result display area 404 displays a graph in which the originally scheduled test plan is compared with the predicted test performance, i.e., the graph indicating a temporal change in the number of tests originally scheduled to be executed and a temporal change in the number of executed tests based on the predicted test performance. More specifically, in the graph, the relationship between the number of days elapsed and the number of test cases (tests) that are scheduled to be completely executed in accordance with the original schedule is compared with the relationship between the number of days elapsed and the number of test cases that are to be completely executed in accordance with the test performance predicted after execution of the simulation process (in this case, immediately after execution of the simulation process). The predicted test performance shows the relationship between the number of days elapsed and the test performance predicted for all unexecuted test cases, which are suitably selected by a process to be described later (e.g., by thinning).

Even when the simulation process as described below has not been performed in the current series of processes, if suitable test cases are selected from among all test cases originally scheduled to be tested in or before the last process, the originally scheduled test plan does not match the predicted test performance. Therefore, the operator determines whether it is necessary to select any further test cases with reference to the graph. For example, if the predicted test performance is intolerably behind the original schedule, the operator determines to select further test cases to be thinned out from among the test cases that are to be tested. In such a case, the test cases that are to be tested are changed (by selection) in a process as described below. Displaying a prediction result in the form of an easily readable graph as described above makes it easy for the operator to intuitively (quickly) make the above-described determination. In addition, the graph indicates the temporal change in the number scheduled to be executed as well as the temporal change in the number of executions, and therefore it is possible to readily determine whether to select any further test cases.

Subsequently, the parameter setting unit 22 determines whether the test cases that are to be tested are changed (step S130). Specifically, when the Cancel button 412 shown in FIG. 4 is pressed in accordance with an operational input by the operator or when the Set button 411 is pressed without any further test case being selected, the parameter setting unit 22 determines that the test cases are not changed. On the other hand, when the thinning selection button 406 or the essential selection button 407 is pressed, the parameter setting unit 22 determines that the test cases are changed. If the determination result is that the test cases are changed (Yes in step S130), the procedure advances to step S140, and when no change is to be made (No in step S130) the procedure is temporarily suspended, and the series of processes are repeated again (S110~) when the test case selection apparatus is reactivated.

Next, the parameter setting unit 22 accepts setting of various parameters based on operational inputs by the operator in accordance with the operating screen as shown in FIG. 4 (step S140). Specifically, the parameter setting unit 22 accepts a numerical value that represents a maximum thinning factor, which is inputted to the thinning factor setting text box 408 shown in FIG. 4 by the operator, or a numerical value that represents the number of test cases scheduled to be executed, which is inputted to the test case execution number setting text box 409 by the operator, or the parameter setting unit 22 accepts an operational input to press the thinning selection button 406 or the essential selection button 407.

The numerical value inputted to the thinning factor setting text box 408 defines, for each test specification, the upper limit of the number to be thinned out (i.e., the upper limit of the number of test cases that are not selected to be tested) For example, where ten test cases are included in a given one test specification, if the numerical value is set to 80%, the maximum number to be thinned out is eight (=10×0.8). Accordingly, in the above calculation, decimals are rounded up or down such that at least one test case to be tested is always left in each test specification unless the numerical value is set to 100%. Therefore, it is possible to reduce a testing bias.

In addition, the value inputted to the test case execution number setting text box 409 defines the number of test cases after thinning, and is normally set to a number less than the number of test cases that are to be selected after thinning in a thinning parameter setting dialogue, which will be described later. How the further test cases to be thinned out are determined will be described later.

Furthermore, when the thinning selection button 406 or the essential selection button 407 is pressed, an operating screen for setting detailed parameters as shown in FIG. 5 or 6 is displayed on the display section 40. The operating screens will be described below.

FIG. 5 is a diagram illustrating an exemplary display of the thinning parameter setting dialogue 500, which is displayed when the thinning selection button 406 is pressed. As shown in FIG. 5, the thinning parameter setting dialogue 500 includes: a list box (hereinafter, referred to as the "thinning target rank setting list box") 501 provided in the form of a pull-down menu for setting a rank indicating an importance level assigned to a test case(s) to be thinned out, in order to select the test cases to be thinned out from among all the unexecuted test cases; a display area (hereinafter, referred to as the "thinning target test category selection area") 502, which includes check boxes for setting test categories that are to be assigned to the test cases to be thinned out; and text boxes (hereinafter, referred to as the "thinning target registration date setting text boxes") 503 for setting the range of registration dates that is to be assigned to the test cases to be thinned out.

Furthermore, the thinning parameter setting dialogue 500 includes: a list box (hereinafter, referred to as the "thinning target error setting list box") 504 provided in the form of a pull-down menu for setting the degree of an error assigned to test cases to be thinned out, in order to select the test cases to be thinned based on an occurred error; a display area (hereinafter, referred to as the "thinning target test specification selection area") 505, which includes check boxes for setting test specifications including test cases to be thinned out, in order to perform thinning for each test specification; an OK button 506 for establishing the setting of the above-mentioned various thinning parameters to return to the test case selection dialogue 400 shown in FIG. 4; and a Cancel button 507 for returning to the test case selection dialogue 400 shown in FIG. 4 without establishing the setting of the above-mentioned various thinning parameters.

FIG. 5 shows an example where the parameters are set such that rank-C test cases are thinned out from among all test cases, test cases whose test categories are function test, scenario test and usability test are thinned out, test cases that have exhibited a minor error are thinned out, and test cases under the test specification name "TS00001" are thinned out. Note that the test cases under the test specification name "TS00001" are not necessarily all thinned out, and the test cases are thinned out by the percentage in accordance with a numerical value indicating maximum thinning factor inputted to the thinning factor setting text box 408 shown in FIG. 4 by the operator. Note that test cases selected in an essential selection parameter setting dialogue as described below are not thinned out even if they are targeted to be thinned out in the thinning parameter setting dialogue 500.

FIG. 6 is a diagram illustrating an exemplary display of the essential selection parameter setting dialogue 600, which is displayed when the essential selection button 407 shown in FIG. 4 is pressed. As shown in FIG. 6, the essential selection parameter setting dialogue 600 includes: a list box (hereinafter, referred to as the "essential selection target rank setting list box") 601 provided in the form of a pull-down menu for setting a rank indicating an importance level assigned to test cases that have to be selected, in order to select the test cases that have to be selected from among all unexecuted test cases; a display area (hereinafter, referred to as the "essential selection target test category selection area") 602, which includes check boxes for setting test categories that are to be assigned to the test cases that have to be selected; and a text box (hereinafter, referred to as the "essential selection target keyword setting text box") 603 for setting, as a search term, a keyword assigned to the test cases that have to be selected.

Furthermore, the essential selection parameter setting dialogue 600 includes: a list box (hereinafter, referred to as the "essential selection target error setting list box") 604 provided in the form of a pull-down menu for setting the degree of an error that is to be assigned to the test cases that have to be selected, in order to select the test cases that have to be selected based on an occurred error; a display area (hereinafter, referred to as the "essential selection target test specification selection area") 605, which includes check boxes for setting test specifications including the test cases that have to be selected, in order to select essential test cases for each test specification; an OK button 606 for establishing the setting of the above-mentioned various essential selection parameters, thereby returning to the test case selection dialogue 400 shown in FIG. 4; and a Cancel button 607 for returning to the test case selection dialogue 400 shown in FIG. 4 without establishing the setting of the above-mentioned various essential selection parameters.

In the example shown in FIG. 6, the parameters are set, such that test cases whose test category is "REGRESSION TEST" are always selected from among all test cases, and test cases under the test specification name "TS00003" are always selected. As described earlier, the test cases selected in the essential selection parameter setting dialogue 600 are always selected even if they are targeted for thinning in the thinning parameter setting dialogue 500 shown in FIG. 5.

In this manner, the test cases that are determined by the apparatus operator, such as the designer or administrator, to have to be tested regardless of the priority or importance level set for each test case, are selected in the essential selection parameter setting dialogue 600, and conversely, the test cases that are determined not to have to be tested are selected in the thinning parameter setting dialogue 500. Thus, it is possible to provide a test case selection apparatus capable of suitably selecting preferred test cases that are to be tested in the current round of testing, based on the user's determination.

After the setting of the various parameters is accepted in step S140 as described above, the parameter setting unit 22 determines whether the Apply button 410 shown in FIG. 4 has been pressed (step S150). When the determination result is "pressed" (Yes in step S150), the procedure advances to step S160, and when "not pressed" (No in step S150), the procedure advances to step S180.

Subsequently, in step S160, based on set values of the parameters accepted in step S140 and a priority order determined in accordance with criteria as described below, the simulation executing unit 23 selects predetermined test cases from among all unexecuted test cases, and also calculates a total number of tests predicted to be executed up to the completion day for the testing (e.g., in units of days) based on the number of testing days required for performing the tests associated with the selected test cases. Note that the number of required testing days varies from one test case to another, and therefore the total number of tests predicted to be executed per day varies depending on which test case is selected as "to be tested". A simulation process including selection of the test cases to be tested (for simulation) will be described below in detail.

First, the number of testing days is calculated based on the number of testing days contained in the test specification table 31 stored in the database 30. For example, when half the test cases contained in a given test specification are selected, the number of testing days required for performing tests associated with the selected test cases can be estimated as half the number of testing days contained in the test specification table 31. For purposes of accuracy, the number of days or a period of time required for the tests may be contained in the test case table 32 in association with all the test cases, but this is impractical when there are a number of test cases. In addition, as described earlier, the number of testing days may be an integrated value (actual value) of time actually spent for performing the tests associated with the test cases.

Next, based on the various parameters set in the thinning parameter setting dialogue 500, the simulation executing unit 23 thins out the test cases that are to be thinned out, excluding the test cases that are determined to have to be selected, based on the set values of the various parameters accepted in step S140, i.e., the various parameters set in the essential selection parameter setting dialogue 600, and as necessary, the simulation executing unit 23 automatically thins out the test cases to accord with the number of scheduled executions as described later, so that the test cases to be tested are selected for simulation. Note that the selection is tentative selection for simulation, and test cases that are to be ultimately tested are established by processing in step S190 to be described later.

In this manner, the selection of the test cases to be tested is performed to accord with the value (scheduled execution number) indicating the number of test cases scheduled to be executed, which is inputted to the test case execution number setting text box 409 shown in FIG. 4. However, as described earlier, it is often the case that the scheduled execution number inputted to the test case execution number setting text box 409 is set to be less than the number of test cases less the test cases that are set to be thinned out in the thinning parameter setting dialogue 500. Accordingly, how the further test cases to be thinned out are determined will be described.

Note that when the numerical value indicating the number of test cases scheduled to be executed is equal to or more than the number of remaining test cases, it is not necessary to perform further thinning, and therefore based on the set values of the various parameters accepted in step S140, the simulation executing unit 23 selects test cases to be tested, for simulation, and the procedure advances to the next step S170.

At this time, in order to denote that the number of scheduled executions has been changed, for example, a warning may be displayed or the numerical value may be highlighted.

In the present embodiment, the further test cases to be thinned out are automatically determined after being assigned a priority order indicating the necessity of selection in accordance with predetermined criteria for determining the degree of preset necessity of testing, and the test cases to be thinned out are taken from the bottom of the priority order until the number of thinned-out test cases reaches a predetermined number.

It is conceivable that a criterion for assigning the priority order is established, for example, such that a higher priority order is assigned to test cases with a higher failure count or failure rate determined based on the number of failures or a failure rate in the previous testing, or test cases with a higher importance level determined based on functions targeted for testing, or a higher priority order is assigned to test cases having been assigned a higher priority value (e.g., critical ones have been assigned a higher value and minor ones a lower value. In addition, a plurality of such criteria may be used. For example, when the orders are the same in accordance with one criterion, the orders may be determined in accordance with another criterion. Furthermore, the test cases to be thinned out may be quickly determined based on a predetermined criterion without assigning any priority order.

In this manner, the test cases are automatically thinned out until the number of thinned-out test cases reaches the number of scheduled executions inputted to the test case execution number setting text box 409, and therefore while considering the operator's determination as to whether or not to select test cases in the thinning parameter setting dialogue 500 and the essential selection parameter setting dialogue 600, test cases that may or may not be thinned out are automatically selected, making it possible to save the operator the trouble of determining whether or not to select for each test case.

As such, the simulation executing unit 23 thins out predetermined test cases from among all the unexecuted test cases, thereby selecting the test cases to be executed, and calculates a prediction value for the number of tests (total number of tests) for each day up to the completion day for the testing.

Next, based on the calculation result by the simulation process in step S160, the parameter setting unit 22 displays an operating screen, which includes a graph for comparing the test plan with the test performance, on the display screen of the display section 40 (step S170). This processing is similar to step S120, except that test performance is predicted by the simulation process, and therefore the description thereof will be omitted. Displaying the prediction result in the form of an easily readable graph in this manner makes it easy for the operator to intuitively (quickly) make the determination. In addition, the temporal change in the number of executions scheduled in the test plan is additionally displayed, and therefore it is possible to allow the operator to readily determine whether it is necessary to select any further test cases. Note that executed test performance may be displayed as well.

Subsequently, the parameter setting unit 22 determines whether the Set button 411 shown in FIG. 4 is pressed in accordance with the operator's operational input (step S180). If the determination result is "pressed" (Yes in step S180), the procedure advances to step S190, and if "not pressed" (No in step S180), the procedure returns to step S140, where the above processing is repeated (S180→S140→S150→ . . . →S180) until the Set button 411 is pressed. Note that if the Cancel button 412 shown in FIG. 4 is pressed during the processing, the procedure is temporarily suspended, and the series of processes are repeated again when the test case selection apparatus is reactivated.

Next, the test case determining unit 24 selects the test cases selected by the simulation process in step S160 as test cases that are to be actually tested (step S190). Specifically, "unexecuted" is stored within test result fields of the test case table 32 that correspond to the selected test cases, to indicate that the test cases are thinned out (deselected). Thereafter, the procedure is temporarily suspended, and the series of processes are repeated again when the test case selection apparatus is reactivated (S110~).

<3. Effect>

In the above embodiment, the parameter setting unit 22 displays the test case selection dialogue 400, etc., on the display screen of the display section 40, and test cases that are tentatively determined to be tested in the current round of testing are selected based on various parameters received from the operator. The simulation executing unit 23 calculates a time period predicted to be required for testing the selected test cases, and displays the prediction result in the form of a graph indicating a temporal change in the number of tests. Accordingly, the operator can predict an achieved status of testing based on the prediction result. In addition, the operator repeats suitable changes to the various parameters, thereby suitably selecting test cases to obtain a preferably achieved status of testing. Thus, it is possible to select preferred test cases that are to be tested by the scheduled completion day for the testing (e.g., without running out of time to perform important testing), thereby making it possible to more efficiently track down any malfunction present in the software system targeted for the testing. As a result, it becomes possible to provide a high-quality software system in a lesser number of man-hours.

<4. Variant>

In step S110 of the above embodiment, the test monitoring unit 21 monitors the execution performance (test performance) in the current round of testing to exclude test cases for which the current round of testing has been executed from targets of selection, and test cases with the test result "unexecuted" are targeted for selection. However, instead of this, the test cases with the test result "unexecuted" and the test cases with the test result "untested" may be selected. With this configuration, contrary to the above, it is possible to increase (augment) the number of test cases that are to be currently tested. As a result, it becomes possible to increase the number of test cases that are to be currently tested, thereby enhancing the system quality.

In step S120 of the above embodiment, the simulation result display area 404 within the test case selection dialogue 400 displays a graph in which the originally scheduled test plan is compared with the predicted test performance. However, the prediction result does not have to be displayed in the form of a graph, so long as the prediction result contains information concerning a period of time predicted to be required for the testing. For example, the number of tests predicted to be executed per unit of time may be displayed in the form of a table, or may be indicated by a numerical value such as a test achievement rate per unit of time elapsed.

In addition, upon each simulation, the graph is updated to a new graph corresponding to the simulation, but for example, graphs corresponding to the past three rounds of simulation may be individually displayed (e.g., in juxtaposition). With this configuration, the operator can compare the graphs together to suitably select test cases that achieve a more preferable achieved status of testing.

In step S150 of the above embodiment, it is determined whether the Apply button 410 in the test case selection dialogue 400 has been pressed, and only when the button has been pressed, the simulation process in step S160 and the graph display in step S170 are performed. However, the Apply button 410 may be omitted, and the simulation process in step S160 and the graph display in step S170 may be automatically performed upon each operational input to each respective dialogue to change various parameters, or at any subsequent suitable time.

While the invention has been described in detail, the foregoing description is in all aspects illustrative and not restrictive. It is understood that numerous other modifications and variations can be devised without departing from the scope of the invention.

Note that the present application claims priority to Japanese Patent Application No. 2006-165605, titled "TEST CASE SELECTION APPARATUS AND PROGRAM FOR SOFTWARE SYSTEM", filed on Jun. 15, 2006, which is incorporated herein by reference.

What is claimed is:

1. A test case selection apparatus for selecting an execution target test case group, which consists of a plurality of test cases that are to be executed in a current round of testing, from among a generated test case group, which consists of a plurality of test cases that are previously generated and that are to be repeatedly tested, the apparatus comprising:

a parameter setting unit for accepting an operational input to set a predetermined parameter intended to select or not to select a plurality of test cases from among the generated test case group as a tentative execution target test case group;

a simulation executing unit for selecting the tentative execution target test case group from among the generated test case group based on the parameter set by the parameter setting unit, calculating a time period that is predicted to be required for testing the selected tentative execution target test case group based on a time period required for testing the generated test case group, and displaying a prediction result containing information concerning the calculated time period; and a test case determining unit for accepting an operational input to establish the tentative execution target test case group as the execution target test case group in accordance with the prediction result displayed by the simulation executing unit, and establishing the tentative execution target test case group as the execution target test case group upon acceptance of the operational input, wherein when the operational input to establish the tentative execution target test case group as the execution target test case group is not accepted, the test case determining unit is capable of accepting a further operational input to establish the tentative execution target test case group as the execution target test case group in accordance with a different prediction result displayed by the simulation executing unit based on a different parameter accepted by the parameter setting unit, and wherein the parameter setting unit includes:

an essential selection parameter setting unit for accepting an operational input to set a predetermined parameter for defining an essential selection target test case group that is always selected as the tentative execution target test case group; and a thinning parameter setting unit for accepting an operational input to set a predetermined parameter for defining a thinning target test case group that is never selected as the tentative execution target test case group unless being included in the essential selection target test case group.

2. The test case selection apparatus according to claim 1, wherein the parameter setting unit accepts an operational input to set a total number of test cases that are to be included in the tentative execution target test case group, and
wherein the simulation executing unit further selects the tentative execution target test case group from among the generated test case group, excluding the essential selection target test case group and the thinning target test case group, based on a predetermined criterion for determining a degree of necessity of testing, the tentative execution target test case group being selected so as to include test cases equal in number to the total number.

3. The test case selection apparatus according to claim 1, wherein the simulation executing unit displays, as the prediction result, a graph indicating a temporal change in number of executions predicted when the tentative execution target test case group is tested.

4. The test case selection apparatus according to claim 3, wherein when the generated test case group is tested, the simulation executing unit displays at least either a graph indicating a temporal change in a predetermined number of scheduled executions or a graph indicating a temporal change in number of test cases that have been tested within the generated test case group.

5. The test case selection apparatus according to claim 1, further comprising a monitoring unit for monitoring tests executed by the apparatus or a device external to the apparatus, wherein the monitoring unit excludes test cases that have been tested in the current round of testing from among the generated test case group.

6. A recording medium, having recorded thereon a test case selection program for implementing, a test case selection apparatus for selecting an execution target test case group, which consists of a plurality of test cases that are to be executed in a current round of testing, from among a generated test case group, which consists of a plurality of test cases that are previously generated and that are to be repeatedly tested, the program, when executed by a general-purpose computer, causing the computer to perform:
   a parameter setting step of accepting an operational input to set a predetermined parameter intended to select or not to select a plurality of test cases from among the generated test case group as a tentative execution target test case group;
   a simulation executing step of selecting the tentative execution target test case group from among the generated test case group based on the parameter set in the parameter setting step, calculating a time period that is predicted to be required for testing the selected tentative execution target test case group based on a time period required for testing the generated test case group, and displaying a prediction result containing information concerning the calculated time period; and
   a test case determining step of accepting an operational input to establish the tentative execution target test case group as the execution target test case group in accordance with the prediction result displayed in the simulation executing step, and establishing the tentative execution target test case group as the execution target test case group upon acceptance of the operational input,
   wherein when the operational input to establish the tentative execution target test case group as the execution target test case group is not accepted, the test case determining step is capable of accepting a further operational input to establish the tentative execution target test case group as the execution target test case group in accordance with a different prediction result displayed in the simulation executing step based on a different parameter accepted in the parameter setting step, and
wherein the parameter setting step includes:
   an essential selection parameter setting step of accepting an operational input to set a predetermined parameter for defining an essential selection target test case group that is always selected as the tentative execution target test case group; and
   a thinning parameter setting step of accepting an operational input to set a predetermined parameter for defining a thinning target test case group that is never selected as the tentative execution target test case group unless being included in the essential selection target test case group.

7. The recording medium according to claim 6, wherein in the parameter setting step, an operational input is accepted to set a total number of test cases that are to be included in the tentative execution target test case group, and
wherein in the simulation executing step, further the tentative execution target test case group is selected from among the generated test case group, excluding the essential selection target test case group and the thinning target test case group, based on a predetermined criterion for determining a degree of necessity of testing, the tentative execution target test case group being selected so as to include test cases equal in number to the total number.

8. The recording medium according to claim 6, wherein in the simulation executing step, a graph indicating a temporal change in number of executions predicted is displayed as the prediction result when the tentative execution target test case group is tested.

9. The recording medium according to claim 8, wherein when the generated test case group is tested, in the simulation executing step, at least either a graph indicating a temporal change in a predetermined number of scheduled executions or a graph indicating a temporal change in number of test cases that have been tested within the generated test case group is displayed.

10. The recording medium according to claim 6, further causing the computer to perform a monitoring step of monitoring tests executed by the apparatus or a device external to the apparatus, wherein in the monitoring step, test cases that have been tested in the current round of testing from among the generated test case group are excluded.

11. A test case selection method for selecting an execution target test case group, which consists of a plurality of test cases that are to be executed in a current round of testing, from among a generated test case group, which consists of a plurality of test cases that are previously generated and that are to be repeatedly tested, the method comprising:
   a parameter setting step of accepting an operational input to set a predetermined parameter intended to select or not to select a plurality of test cases from among the generated test case group as a tentative execution target test case group;
   a simulation executing step of selecting the tentative execution target test case group from among the generated test case group based on the parameter set in the parameter setting step, calculating a time period that is predicted to be required for testing the selected tentative execution target test case group based on a time period required for testing the generated test case group, and displaying a prediction result containing information concerning the calculated time period; and a test case determining step of accepting an operational input to establish the tentative execution target test case group as the execution target test case group in accordance with the prediction result displayed in the simulation executing step, and establishing the tentative execution target test case group as the execution target test case group upon acceptance of the operational input, wherein when the operational input to establish the tentative execution target test case group as the execution target test case group is not accepted, the test case determining step is capable of accepting a further operational input to establish the tentative execution target test case group as the execution target test case group in accordance with a different prediction result displayed in the simulation executing step based on a different parameter accepted in the parameter setting step, and wherein the parameter setting step includes:
an essential selection parameter setting step of accepting an operational input to set a predetermined parameter for defining an essential selection target test case group that is always selected as the tentative execution target test case group; and a thinning parameter setting step of accepting an operational input to set a predetermined parameter for defining a thinning target test case group that is never selected as the tentative execution target test case group unless being included in the essential selection target test case group.

* * * * *